June 6, 1933.  A. B. KEAGLE  1,913,082
LICENSE PLATE HOLDER
Filed Dec. 27, 1932
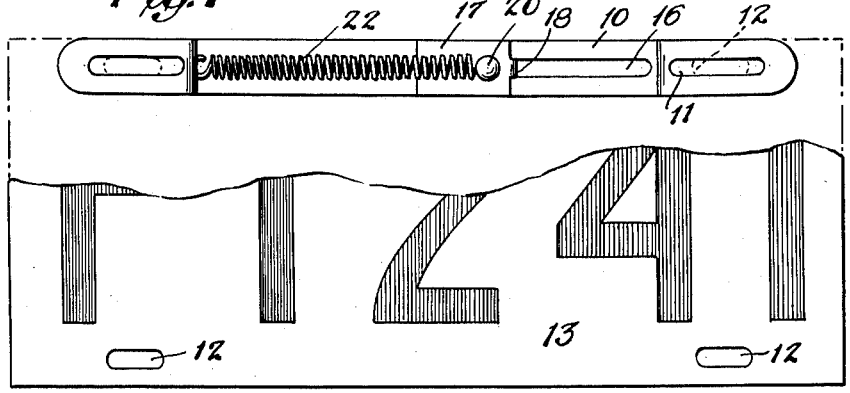
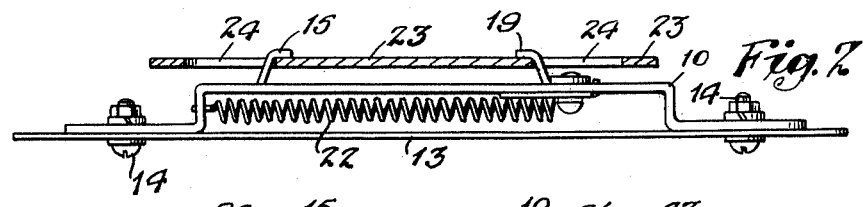
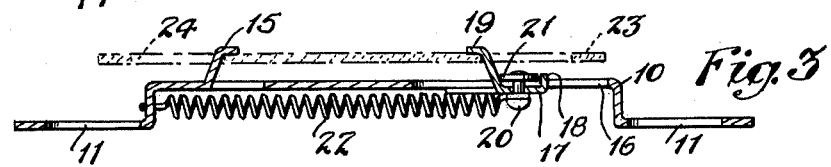
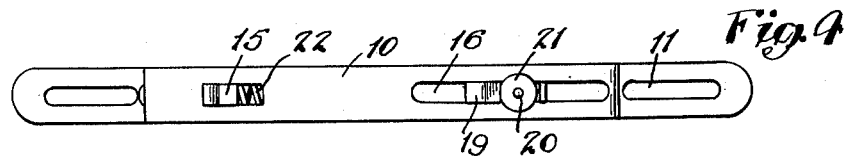
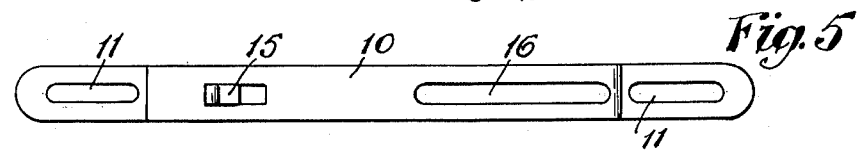
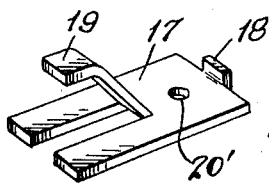
Inventor
Albert B. Keagle
By Wm. L. Symons
Attorney Patented June 6, 1933

1,913,082

UNITED STATES PATENT OFFICE

ALBERT B. KEAGLE, OF BUTLER, PENNSYLVANIA

LICENSE PLATE HOLDER

Application filed December 27, 1932. Serial No. 649,069.

My invention relates to supports for removably attaching license plates or the like to automobiles, although not necessarily restricted to this use.

In the automotive trade, it is frequently desirable to move license plates from one vehicle to another, and with the usual form of attaching means a great deal of time and labor are lost in making these changes. An important object of my invention, therefore, is to provide a license plate holder which will permit rapid attachment to and removal from a vehicle.

Another object of my invention is the provision of a device of this character which is simple in construction and operation, inexpensive to manufacture, strong and durable.

Other objects and advantages of my invention will be apparent during the course of the following description.

In the accompanying drawing, which forms a part of this specification and wherein like characters of reference denote like parts throughout the same, Figure 1 is an elevation of a license plate and holder, parts of the license plate being broken away, Figure 2 is a top plan view thereof showing the holder attached to the vehicle support, Figure 3 is a longitudinal sectional view through the holder, Figure 4 is a rear view thereof, Figure 5 is a rear elevation of the main bar or bracket of the holder, and, Figure 6 is a perspective view of the movable lug and plate.

In the drawing, wherein for the purpose of illustration is shown a preferred embodiment of my invention, the numeral 10 designates the main bar or body portion of the license plate holder, the major portion of the body member being offset between its ends, as seen in Figures 2 and 3. The ends of the body member 10 are aligned and provided with elongated slots 11 extending longitudinally of the body member and adapted to correspond with the usual spaced slots 12 in a license plate 13. The usual bolts 14 secure the license plate to the body member 10 and extend through slots 11 and 12.

The offset portion of the body member has a centrally arranged tongue or lug 15 struck up therefrom adjacent one end thereof, and which extends at an angle to the body member away from the license plate as seen in Figure 2. The end of the tongue 15 is bent over into parallel relation with the body member 10 and is spaced a substantial distance therefrom. A centrally arranged elongated slot 16 is arranged in the opposite end of the offset portion of the body member. A plate slide 17 has the same width as the body member and has a central ear 18 formed at one end and turned up at a right angle, as seen in Figures 3 and 6. A tongue or lug 19 is struck up from the other end of the plate 17 and has its end turned over parallel to the plate 17. In assembling the slide, the tongue 19 and ear 18 are passed through slot 16 and the plate is slidably secured to the body member by means of a bolt 20 extending through an opening 20' in the plate 17 and through slot 16 and secured to a washer 21 which is wider than the slot 16 and slidably engages the body member at either side thereof. It will be seen that the washer 21 is arranged between ear 18 and tongue 19.

A coil spring 22 is anchored at one end to bolt 20 and at its other end has a loop which passes through suitable openings in the shoulder formed by the offset portion of the body member. The tension of the spring 22 forces the slide 17 toward the end of slot 16 closest to the tongue 15. The tongues 15 and 19 face each other, and tongue 19 is urged toward tongue 15 by the spring. In practice it is desirable to form the tongue 19 slightly longer than tongue 15, as tongue 19 is first to engage the supporting bracket, shown at 23 in Figures 2 and 3. The bracket 23 is provided with the usual elongated slots 24.

In operation the license plate is rigidly attached to the ends of the body member 10 by means of bolts 14 and suitable nuts and washers. The offset portion of the member 10 is then arranged in spaced relation to the license plate 13, and the spring 22 and slide 17 are located in the space between the license plate and the offset portion of the body member 10. The spring and slide are, therefore, free to operate without interference and without danger of being impeded by any part of the vehicle. The only parts which project outwardly beyond the body member 10 are the tongues 15 and 19 and the washer 21. To attach the license plate to the bracket or holder 23 on the vehicle, it is only necessary to insert tongue 19 in slot 24 and move the member 10 against tension of spring 22 to move the tongues 15 and 19 apart to a point where tongue 19 may be inserted in the other slot 24. To remove the plate it is only necessary to grasp the license plate or body member 10 and move it to the left, in the position shown in Figures 2 and 3, against tension of spring 22 until tongue 15 may be disengaged from slot 24. The tongue 19 may then be readily removed from the other slot 24, and the plate is released from the vehicle. It will be seen that the license plate may be removed from a vehicle or attached thereto with a single movement.

It will be also seen that my invention is of extremely simple construction, comprising but three simple units; the body member, the slide plate with its bolt and washer and the spring 22. The movable parts, with the exception of tongue 19 are arranged in a protected position.

In place of attaching the top of the license plate to body member 10 it may obviously be attached at its lower end. The slotted bracket 23 is not necessary to the operation of my holder, as the tongues 15 may obviously engage the outer edges of an unslotted bracket, or be secured to various parts of the vehicle, the tension of spring 22 being sufficient to maintain the device in the desired position.

While I have shown and described the preferred embodiment of my invention, it is to be understood that various changes in the size, shape and arrangement of parts may be resorted to without departing from the spirit of my invention or the scope of the subjoined claims.

Having thus described my invention what I claim and desire to protect by Letters Patent is:

1. The combination with a license plate, of a body member, means to secure the license plate to said body member, and means to removably secure the body member to a vehicle comprising a pair of lugs carried by said body member, one of said lugs being movable, and resilient means carried by said body member to urge said lugs together, said resilient means being arranged between the body member and license plate.

2. The combination with a license plate, of a body member having an offset portion between its ends, means to secure the license plate to the body member, and means to removably secure said body member to a vehicle comprising a pair of lugs carried by the body member, one of said lugs being movable, and resilient means arranged to urge said lugs together, said resilient means being arranged within the offset portion of the body member and between the body member and license plate.

3. The combination with a license plate, of a body member having an offset portion between its ends, means to secure the license plate to the ends of the body member, and means to removably secure said body member to a vehicle comprising a pair of lugs carried by the offset portion of the body member, one of said lugs being movable, and resilient means engaging said movable lug and normally urging it toward the other lug, said resilient means being arranged within the offset portion of the body member and between the license plate and body member.

4. In a device of the character described, a body member having an offset portion between its ends, means to secure a license plate to the ends of the body member, and means to removably secure the body member to a vehicle comprising a lug arranged on the offset portion of the body member, said offset portion of the body member having an elongated longitudinal slot spaced from the lug, a plate having a lug extending through said elongated slot, said plate being slidably secured to said body member, and resilient means carried by said body member and engaging said plate to urge the plate towards the first named lug.

5. The combination with a license plate, of a body member having an offset portion between its ends, means to secure the license plate to the ends of the body member, and means to removably secure the body member to a vehicle comprising a lug arranged on the offset portion of the body member, said offset portion of the body member having an elongated longitudinal slot spaced from the lug, a plate having a lug extending through said elongated slot, said plate being slidably secured to said body member, and resilient means carried by said body member and engaging said plate to urge the plate towards the first named lug, said resilient means being arranged between the offset portion of the body member and the license plate.

6. In a device of the character described, a body member having an offset portion between its ends, said offset portion having an elongated slot therein, means to secure a license plate to the ends of the body member, a lug carried by said offset portion of the body member at a point spaced from the elongated slot, a slide plate having an ear to engage the elongated slot, a lug carried by said slide plate at a point spaced from the ear and adapted to extend through the elongated slot, means to slidably secure the slide plate to the body member, and resilient means carried by the body member and engaging the slide plate to urge it toward the lug carried by the body member.

7. The combination with a license plate, of a body member having an offset portion between its ends, said offset portion having an elongated slot therein, means to secure the license plate to the ends of the body member, a lug carried by said offset portion of the body member at a point spaced from the elongated slot, a slide plate having an ear to engage the elongated slot, a lug carried by said slide plate at a point spaced from the ear, and adapted to extend through the elongated slot, means to slidably secure the slide plate to the body member, and resilient means carried by the body member and engaging the slide plate to urge it toward the lug carried by the body member, said resilient means and said slide plate being arranged between the offset portion of the body member and the license plate.

8. In a device of the character described, a body member having an offset portion between its ends, means to secure a license plate to the body member, and means to removably secure said body member to a vehicle comprising a pair of lugs carried by the body member, one of said lugs being movably supported by said offset portion of the body member, and resilient means arranged to urge said lugs together, said resilient means being arranged within the offset portion of the body member.

In testimony whereof I affix my signature.

ALBERT B. KEAGLE.